United States Patent [19]
Catron et al.

[11] Patent Number: 6,146,671
[45] Date of Patent: Nov. 14, 2000

[54] METHOD AND PROTECTING HEAT-OR OXYGEN-LABILE COMPOUNDS TO PRESERVE ACTIVITY AND BIOAVAILABILITY

[75] Inventors: Douglas Howard Catron, Altoona; James Oscar Mann, Pleasant Hill, both of Iowa

[73] Assignee: Kemin Industries, Inc., Des Moines, Iowa

[21] Appl. No.: 09/307,414

[22] Filed: May 8, 1999

[51] Int. Cl.[7] .................................................. A23L 1/30
[52] U.S. Cl. ........................ 426/89; 426/72; 426/268; 426/302; 426/303; 426/311; 426/541; 426/648; 426/658; 426/807
[58] Field of Search .......................... 426/89, 268, 541, 426/648, 807, 311, 302, 303, 658, 72

[56] References Cited

U.S. PATENT DOCUMENTS

| | | | |
|---|---|---|---|
| 4,389,419 | 6/1983 | Lin et al. | 426/72 |
| 5,356,636 | 10/1994 | Schneider et al. | 424/489 |
| 5,427,935 | 6/1995 | Wang et al. | 435/178 |

FOREIGN PATENT DOCUMENTS

| 689834 | 1/1996 | European Pat. Off. . |
|---|---|---|

OTHER PUBLICATIONS

Alan H. King; "Encapsultion of Food Ingredients"; ACS Symposium Series 590; 1995 American Chemical Society; pp. 26–39; Kelco Division, Merck & Co., Inc., 75 Terminal Avenue, Clark, NJ 07066.

L. A. Wagner; "Stability of Spray-dried Encapsulated Carrot Carotenes"; Journal of Food Science Sep./Oct. 1995; vol. 60(5) pp. 1048–1053; abstract only.

BASF Animal Nutrition; Technical Specification TS 9509; abstract only 1999.

*Primary Examiner*—Chhaya D. Sayala
*Attorney, Agent, or Firm*—Kent A. Herink; Daniel A. Rosenberg; Davis, Brown, Koehn, Shors & Roberts, P.C.

[57] ABSTRACT

A method for protecting the activity and bioavailability of heat- and/or oxygen-labile compounds during processing, particularly processing by extrusion of a food product containing the heat- and/or oxygen-labile compounds. Beadlets are formed wherein the heat- and/oxygen-labile compound is protected by a shell of calcium alginate and an ancillary polymeric compound, such as gelatin. The beadlets are added to a food product prior to extrusion and protect the active compound against heat degradation during the extrusion process. The beadlets also provide a protected form of the compound that decreases oxidation. In an alternative embodiment, oxidizing agents and/or free radical initiators to be added to a product containing labile compounds are coated with the protective material to protect the labile compounds from degradation by the oxidizing agents and/or free-radical initiators.

11 Claims, 4 Drawing Sheets

METHOD AND PROTECTING HEAT-OR OXYGEN-LABILE COMPOUNDS TO PRESERVE ACTIVITY AND BIOAVAILABILITY

BACKGROUND OF THE INVENTION

1. Field of the Invention

The invention relates to a method of protecting heat-labile and/or oxygen-labile compounds and, more specifically, to heat- and/or oxygen-labile compounds that are coated to protect the activity of the compounds or the labile component of a food or feedstuff, particularly following extrusion, without sacrificing the bioavailability of the compounds upon ingestion.

2. Background of the Art

Many biologically important compounds lose activity if exposed to heat or oxygen, wherein the heat or oxygen lability of the compounds may be related to the degree of unsaturation, i.e., the presence of double bonds, of the compounds. Such compounds include many of the vitamins. Also included are antioxidants. Numerous attempts have been made in an effort to stabilize these compounds so that the activity of the compounds is maintained over longer periods of time upon exposure to heat and/or oxygen. Certain of these methods have focused on coating of the compounds with a protective material, including gelatin and alginate. Protecting the compounds against degradation is not the only concern, however. The protected compounds must also be available for biological absorption upon ingestion. These two purposes are inherently conflicting in that known methods of protection of the compounds during processing and storage have also limited or prevented absorption of the compounds so that less of the biologically important compound is effectively delivered to the ingesting organism.

One of the major uses of these heat- and/or oxygen-labile compounds is in the supplementation of food, including both human food and animal feed. Ambient temperatures and storage conditions typically lead to a loss of activity of the compounds over time frames that are usually shorter than the other limiting times for most foods. While the use of sealed containers and low-temperature storage ameliorates the degradation of the compounds, these methods are expensive and often not practical. Many food processing methods use heat which further reduces the level of active heat-labile and oxygen-labile compounds. A particularly common and destructive food processing method is extrusion, a process that involves aggressive comminuting of the food product under extreme temperatures and pressures. Extrusion is used in the commercial production of almost all dry pet foods, and is very common in the production of ready-to-eat cereals. Recent studies have shown in excess of 60% sacrifice of carotenoids through extrusion processing. Addition of the compounds after extrusion leaves the compounds more susceptible to oxidation due to oxygen in the atmosphere and results in visual detection of the compound on the surface of the food product. Application is also difficult because of product wicking of the surface of the extruded diet which results in active ingredients being transferred to the sides of the container in which the diet is stored.

Attempts to encapsulate biologically active compounds using gelatin have had mixed results. To be an effective coating, the gelatin must be extensively cross-linked. Unfortunately, cross-linked gelatin is not readily dissolved in the digestive tract. Accordingly, while increasing the cross-linking of the gelatin increases its protective qualities, it decreases the bioavailability of the protected compound. Various forms of alginate have been used in a variety of encapsulation techniques. One such technique involves dissolving sodium alginate in water, adding the "payload" compound to be protected, and spraying the solution into a bath containing calcium ions. As the droplets enter the bath, the soluble sodium alginate is rapidly converted into insoluble calcium alginate, effectively encapsulating the "payload" compound. The calcium alginate beadlets are digested by ionic exchange with other salts during digestion. However, the use of calcium alginate alone produces a beadlet that is substantially oxygen permeable. Tests on calcium alginate by Southwest Research Institute are that oxygen permeability of a calcium alginate membrane at standard temperature and pressure is $2.91 \times 10^{11}$ cm cm$^3$/cm$^2$s (cm Hg).

The only option in the known prior art is to over-formulate the liable components that are included in the food or feedstuff. This over-formulation adds unnecessary expense and does not guarantee product performance. Neither alginate or gelatin beadlets have provided both adequate protection and bioavailability of the encapsulated compounds.

Encapsulation of the active compounds protects them against oxygen degradation not only through physical protection from contact with oxygen, but also by protecting them against interaction with oxidizing agents and free-radical initiators that may be present in the substrate, such as a food product, to which the encapsulated compounds have been added. For example, polyvalent metal ions, such as iron, copper, manganese, and chromium, are active oxidizing agents and are also present in food products, particularly food products that have been supplemented with such minerals for improved nutritional characteristics. The presence of these oxidizing agents ordinarily accelerates the oxygen degradation of the unprotected active compounds, particularly if elevated temperatures or pressures are present. In a similar fashion, encapsulation of the active compounds will protect them from radical initiators. In this regard, encapsulation of the active compounds serves another purpose. Certain of these active compounds, such as lutein, are not oxidizing agents or free-radical initiators themselves, but upon degradation become oxidizing agents or free-radical initiators.

Alternatively to coating the labile compounds, or supplementary thereto, is the process of coating of the known oxidizing agents or free-radical initiators that may be added to the product containing the labile compounds. For example, if polyvalent metals are to be added to a food product containing labile compounds, coating of the metals by the process of the present invention will serve to limit the degenerative effect that such substances may have on the labile compounds. In this way, the process of the present invention may be used either directly to protect the labile compounds themselves or indirectly by limiting the activity of oxidizing agents and free-radical initiators. In practical application, the compounds, either the labile compounds or the oxidizing agents or free-radical initiators, or both, being added to the product are subject to coating to provide the protective effect.

There is a need for a method for encapsulating heat- and/or oxygen-labile compounds, or oxidizing agents and free-radical initiators, or both, that will effectively protect labile compounds that have been added or that may otherwise be present from degradation and loss of activity, particularly through the extremely harsh extrusion process, while maintaining the bioavailability of the labile compounds upon ingestion after extrusion.

SUMMARY OF THE INVENTION

The invention consists of a method of encapsulating heat- and/or oxygen-labile compounds with a protective coating that will limit the loss in activity of the compound during processing, particularly extrusion, and storage of a food product containing the encapsulated compound while maintaining a high degree of bioavailability of the compound throughout the shelf life of the food product and when the food product is ingested. In an alternative embodiment, oxidizing agents or free-radical initiators, including compounds which release or become such oxidizing agents or free-radical initiators upon degradation, are encapsulated with a protective coating. The invention allows for the supplementation of food products with heat- and/or oxygen labile compounds in combination with other desirable supplements, such as minerals, which are normally antagonistic.

An aqueous solution of sodium alginate is prepared and the compound to be protected is added. One or more ancillary polymeric compound such as carrageenan, locust bean gum, and gelatin are used to improve the encapsulation. The solution is sprayed onto a bath of calcium chloride solution, forming calcium alginate beadlets in which are dispersed a volume of the solution including the protected compound. The beadlets are separated and dried. The beadlets exhibit enhanced stability of the protected compounds through the extrusion process.

DETAILED DESCRIPTION OF THE PREFERRED EMBODIMENTS

Figure 1:
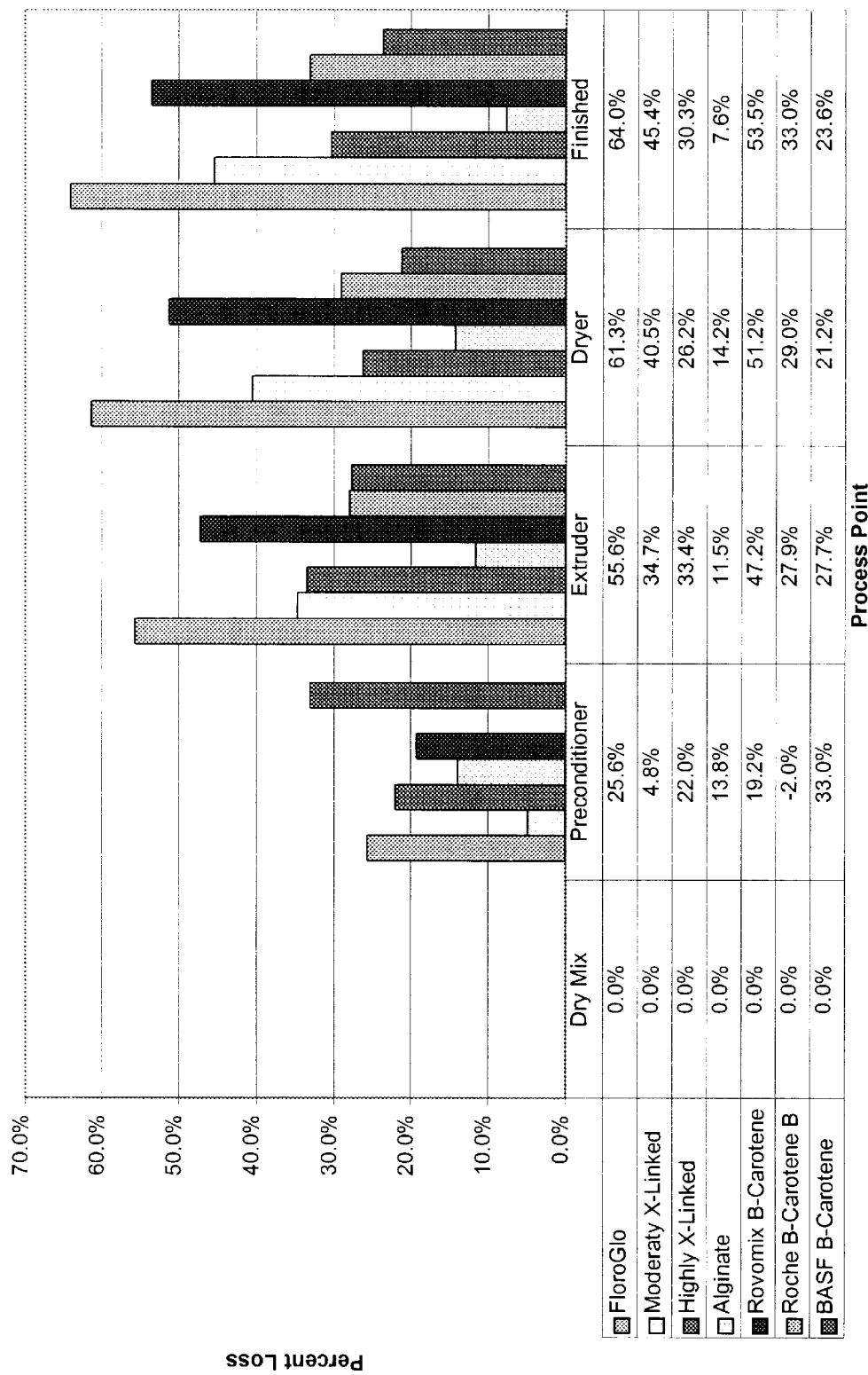
FIG. 1 is a graphical representation of the loss in lutein and β-carotene at various points throughout the extrusion process of a food product which included beadlets of the lutein and a food product which included beadlets of the β-carotene and protected by gelatin and the process of the present invention.

The present method of forming encapsulated biologically active compounds comprises the steps of dissolving sodium alginate in water at room temperature to produce a solution of sodium alginate. Added to the solution is an ancillary polymeric compound, such as gelatin. Other ancillary polymeric agents, such as carrageenan, locust bean gum, guar gum, or the like may be added to the solution or substituted in whole or in part for the gelatin. The biologically active compound(s) are also added to the solution. The mixture is sprayed onto an aqueous bath having a source of calcium ions, such as dissolved calcium chloride. The beadlets that are formed are filtered out of the solution and dried.

The ranges of the sodium alginate, ancillary polymeric material(s), and biologically active compound(s) to be added in the solution are provided on a total dry matter weight basis. The range of sodium alginate is between about 5% and about 90%, the range of ancillary polymeric material(s) is between about 5% and about 90%, and the range of biologically active material(s) is between about 5% and about 50%. Preferably, the range of sodium alginate is between about 30% and about 45%, the range of ancillary polymeric material(s) is between about 30% and about 45%, and the range of biologically active material(s) is between about 10% and about 40%. Most preferably, approximately equal weights of sodium alginate and ancillary polymeric material are used in combination with somewhat less than an equal amount of the biologically active material. In the preferred embodiment set out below, the weight ratio of sodium alginate:ancillary polymeric material:biologically active material is approximately 9:10:6, or 1.5:1.67:1.

Amounts of alginate less than the recited range do not result in satisfactory beadlet formation. Amounts of alginate in excess of the recited range do not have satisfactory oxygen impermeability. Amounts of gelatin less than the recited range result in a beadlet with unsatisfactory oxygen permeability and amounts in excess of the recited range interfere with formation of the alginate web or substrate. Amounts of the biologically active compound(s) below the recited range will not adversely affect the effectiveness of protecting and delivering a biologically available compound, but are not likely to be commercially feasible in that an excess amount of protective material is utilized. Amounts of the biologically active compound(s) greater than the recited range may interfere with formation of an effectively protective beadlet and will adversely affect the economy of the process by increasing the amount of the active compound(s) that is lost during processing and storage.

The ratio of water to dry ingredients used in the solution necessarily depends on the particular one or combination of ancillary polymeric compounds that are used. For example, carrageenan is considerably more viscous at lower concentrations than gelatin. Generally, the ratio falls within a range of between about 15:1 and about 7:1, water: dry ingredients, with a preferred range of between about 12:1 and about 8:1. If less than the recited range of water is used, the viscosity of the solution will start to prevent effective pumping and/or spraying of the solution. If greater than the recited range of water is used, it is difficult to form discrete beadlets.

Experiments were initiated to develop an encapsulation technique for lutein, a carotenoid that is believed to have immune system stimulating effects in dogs, to protect the lutein against degradation during the extrusion process and throughout the shelf life of a food product without adversely affecting its bioavailability upon ingestion of the food product.

Alginate, commercially available as alginic acid, sodium salt, commonly called sodium alginate, is a linear polysaccharide normally isolated from marine brown seaweed and algae. The copolymer consists of two uronic acids: D-mannuronic acid and L-guluronic acid. Alginic acid can be either water soluble or insoluble depending on the type of the associated salt. The salts of sodium, other alkali metals, and ammonia are soluble, whereas the salts of polyvalent cations, e.g., calcium, are water insoluble. Polyvalent cations bind to the polymer whenever there are two neighboring guluronic acid residues. Accordingly, the polyvalent cations are responsible for the cross-linking of both different polymer molecules and different parts of the same polymer chain. The exchange of calcium ions for sodium ions is carried out under relatively mild conditions. In that the method of gelation is based on the availability of guluronic acid residues, and these residues do not vary from the initial conditions in a batch of the alginate, the molecular permeability (pore size) of a pure alginate gel does not depend on the immobilization conditions, but rather is controlled by the choice of the starting material.

Experiments were initiated to develop an encapsulation technique for lutein, a carotenoid that is believed to have immune system stimulating effects in dogs, to protect the lutein against degradation during the extrusion process and throughout the shelf life of a food product without adversely affecting its bioavailability upon ingestion of the food product.

An encapsulated product was produced using the following method. An aqueous solution of sodium alginate is prepared using 320 ml water and 10 g sodium alginate. Added to the solution was 6.666 g of FloraGLO® Lutein Crystalline Dry, a commercially available (Kemin Foods, L.C., Des Moines, Iowa) source of lutein produced under U.S. Pat. No. 5,648,564, containing 80% lutein by weight. Also added was 0.005 ml of Naturox™ Liquid (Kemin Industries), 0.1 g locust bean gum, 10.0 g gelatin, and 1.0 g carrageenan. This mixture was sprayed onto an aqueous bath of 5% calcium chloride. The beadlets that formed were then filtered, dried in a convection oven at between 60° C. and 80° C. until essentially no more moisture was being withdrawn, and mixed with cornstarch until the lutein content was 6.1% by weight.

For comparison purposes, samples of lutein encapsulated in highly cross-linked gelatin and in moderately cross-linked gelatin were also prepared according to the following methods. A 1000 g sample of FloraGLO® 20% Liquid (Kemin Foods) was prepared using the disk method. Shell material solutions were made using 25% Gelatin Bloom 300 and 5% Sorbitol in 70% water, then heated to approximately 55° C. After the shell material reached the desired temperature, 40% of the FloraGLO® was added to provide 5% theoretical payload and mixed to form a dispersion. The dispersion was then pumped at approximately 50 g/min onto a disk rotating at approximately 2000 RPM which created microspheres with a size range of 200–900 micrometers, with an average range of 500–700 micrometers. The reservoir, pump, lines, disk, and material were all maintained at approximately 50–55° C. The microspheres were collected on cornstarch, allowed to dry and then sieved. After the microspheres were collected, they were cross-linked using glutaraldehyde at 5% of the total weight of gelatin. Glutaraldehyde, ethanol and water were combined in the ration of 1:8:1 to prepare the cross-linking solution. The microspheres were added to the solution and allowed to cross-link for an hour. They were placed in a water bath and heated for 10 minutes, then harvested and dried.

As a control, FloraGLO® 5% Dry (Kemin Foods), a form of lutein encapsulated in non-cross-linked gelatin, was also used. Samples of each of the four products were added to a commercial dog food formulation prior to extrusion and then processed by extrusion under conditions of temperatures between about 250° F. and 300° F., pressure of approximately 600 psi for between about 20 and 60 seconds. The resulting extruded product has an initial moisture content of about 25% and is dried between about 15 and 30 minutes at a temperature between about 200° F. and 250° F. to dry it to between 8 and 10% moisture.

For further comparison purposes, commercially available forms of encapsulated β-carotene were evaluated throughout the extrusion process. The encapsulated β-carotene products were Rovimix® Beta-Carotene 10% from Roche (identified as having beta-carotene finely dispersed in a starch-coated matrix of gelatin and carbohydrates), Beta-Carotene 1% B from Roche (identified as having beta-carotene finely dispersed in a starch-coated matrix of fish gelatin, fructose, glycerol), and Lucarotin® from BASF (identified as special food-grade beta-carotene containing a minimum of 7% beta-carotene).

Samples of the food product were taken throughout the process for analysis. FIG. 1 shows the stability of the lutein in the control and by encapsulation using the three techniques and the encapsulated β-carotene from the three commercial sources. Some variation in the data was observed due to the relatively small concentration (between about 60 g and about 600 g) of the encapsulated products that were incorporated in the dog food (one ton batches). The alginate protected lutein showed a surprising amount of stability.

Figure 2:
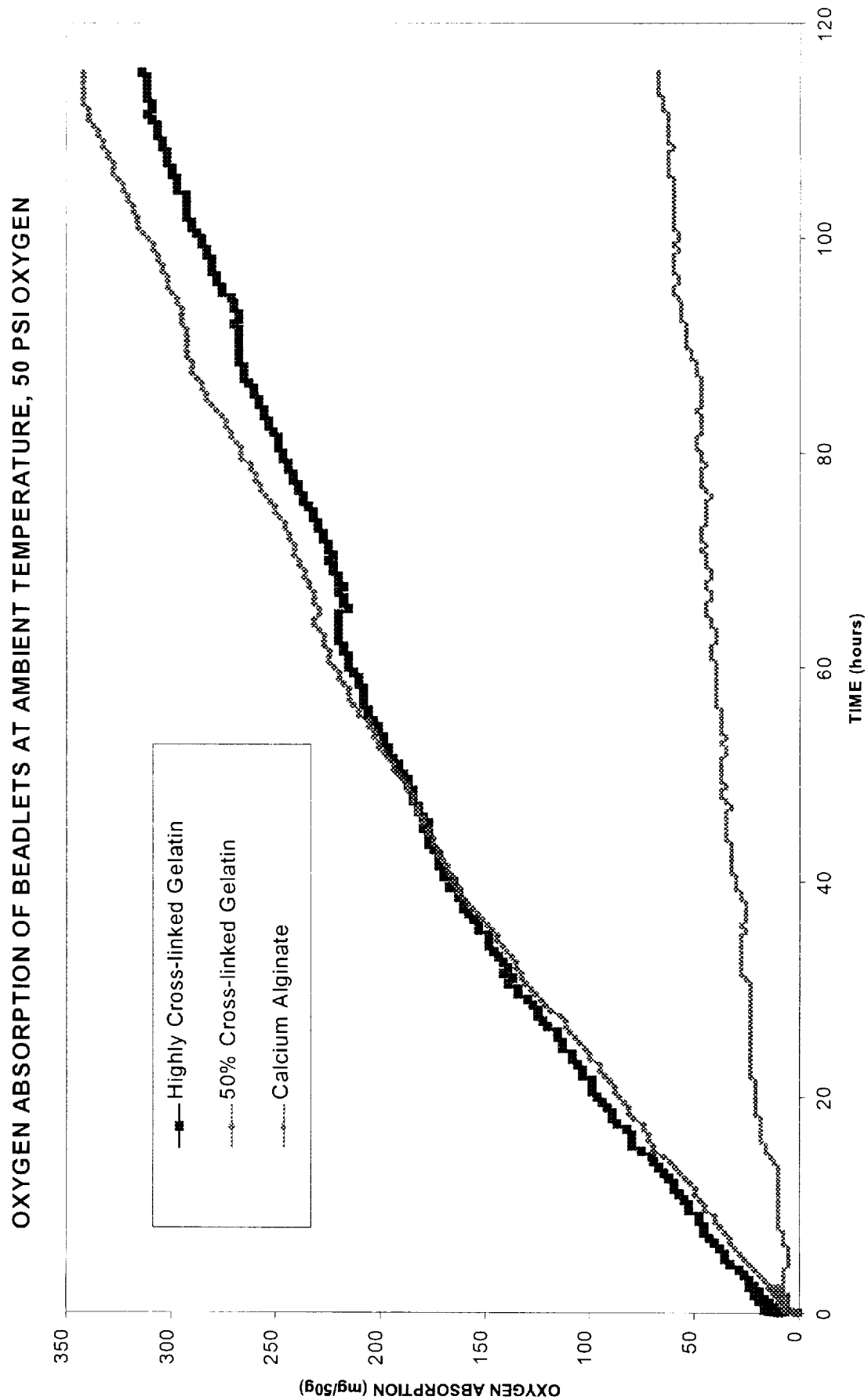
FIG. 2 is a graphical representation of oxygen absorption of beadlets protected by gelatin and the process of the present invention.
Figure 3:
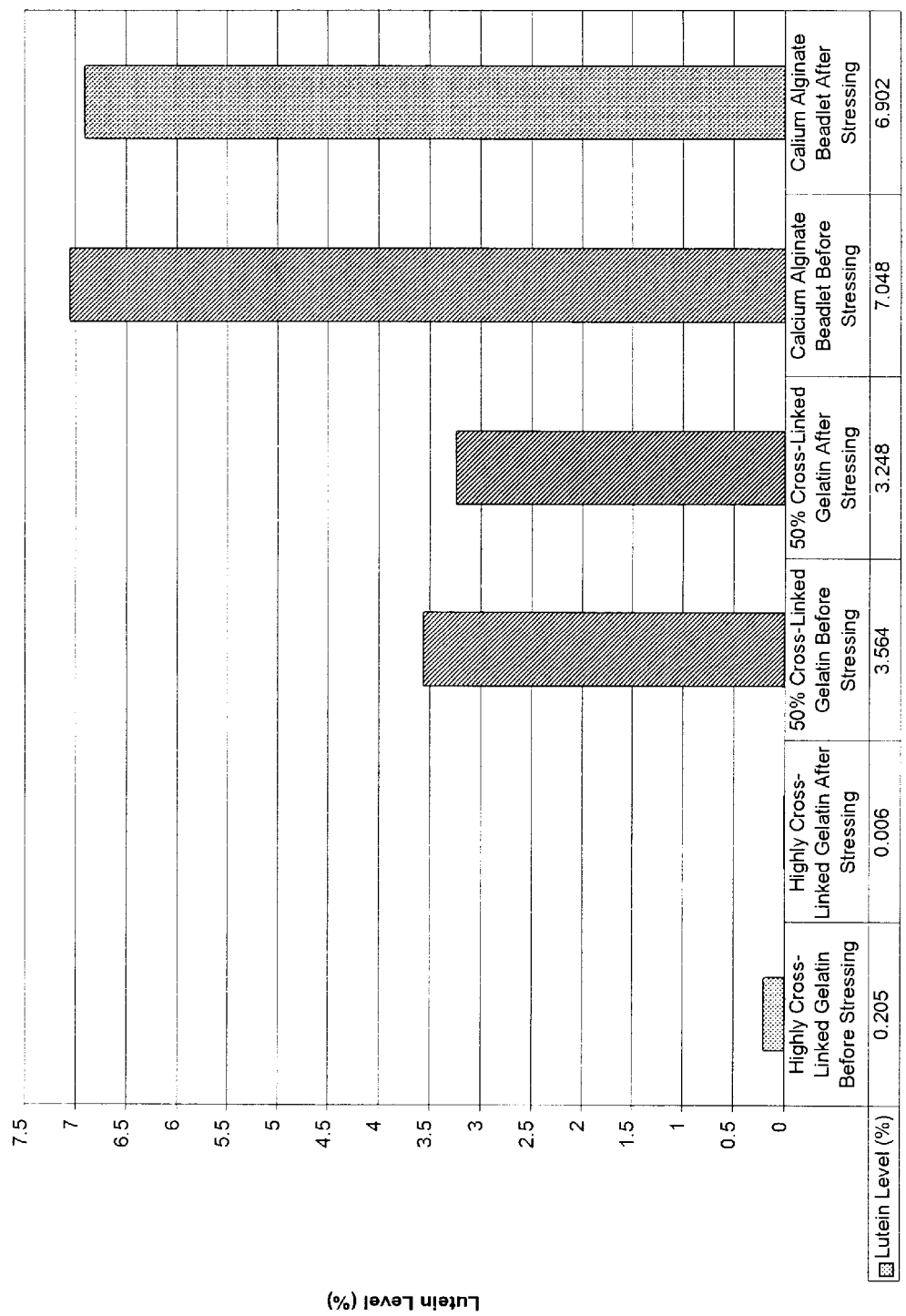
FIG. 3 is a graphical representation of the levels of lutein remaining in beadlets of the lutein and protected by highly cross-linked gelatin, 50% cross-linked gelatin, and the process of the present invention before and after exposure to 50 psi oxygen in an oxygen bomb at standard temperature for 100 hours.

Oxygen permeability of the three encapsulated lutein products was tested by in an oxygen bomb under 50 psi oxygen for 100 hours with the oxygen bomb kept at room temperature during analysis. The results of the tests are set out in FIG. 2 and are summarized in Table 1 and FIG. 3.

TABLE 1

|  | % Lutein Sacrifice |
| --- | --- |
| Highly Cross-Linked Gelatin | 93.3 |
| 50% Cross-Linked Gelatin | 6.4 |
| Alginate Beadlet | 0.7 |

Calcium alginate is a non-thermally reversible and water insoluble polymer. The gelatin added to the alginate in the present invention does not chemically react with the alginate, either sodium or calcium alginate. There is, however, believed to be a degree of physical binding that occurs as the gelatin thermally folds and the alginate cross-links. The beadlets that are produced are a solid dispersion of the lutein in the encapsulating material. The small amount of loss of lutein observed in beadlets of the present invention is believed to be due to surface crystals of lutein that are only thinly covered by the encapsulating material. A stabilizing compound, such as an antioxidant, may be added to the heat- and/or oxygen-labile compound prior to its addition to the solution of protecting materials to protect further the labile compound.

Figure 4:
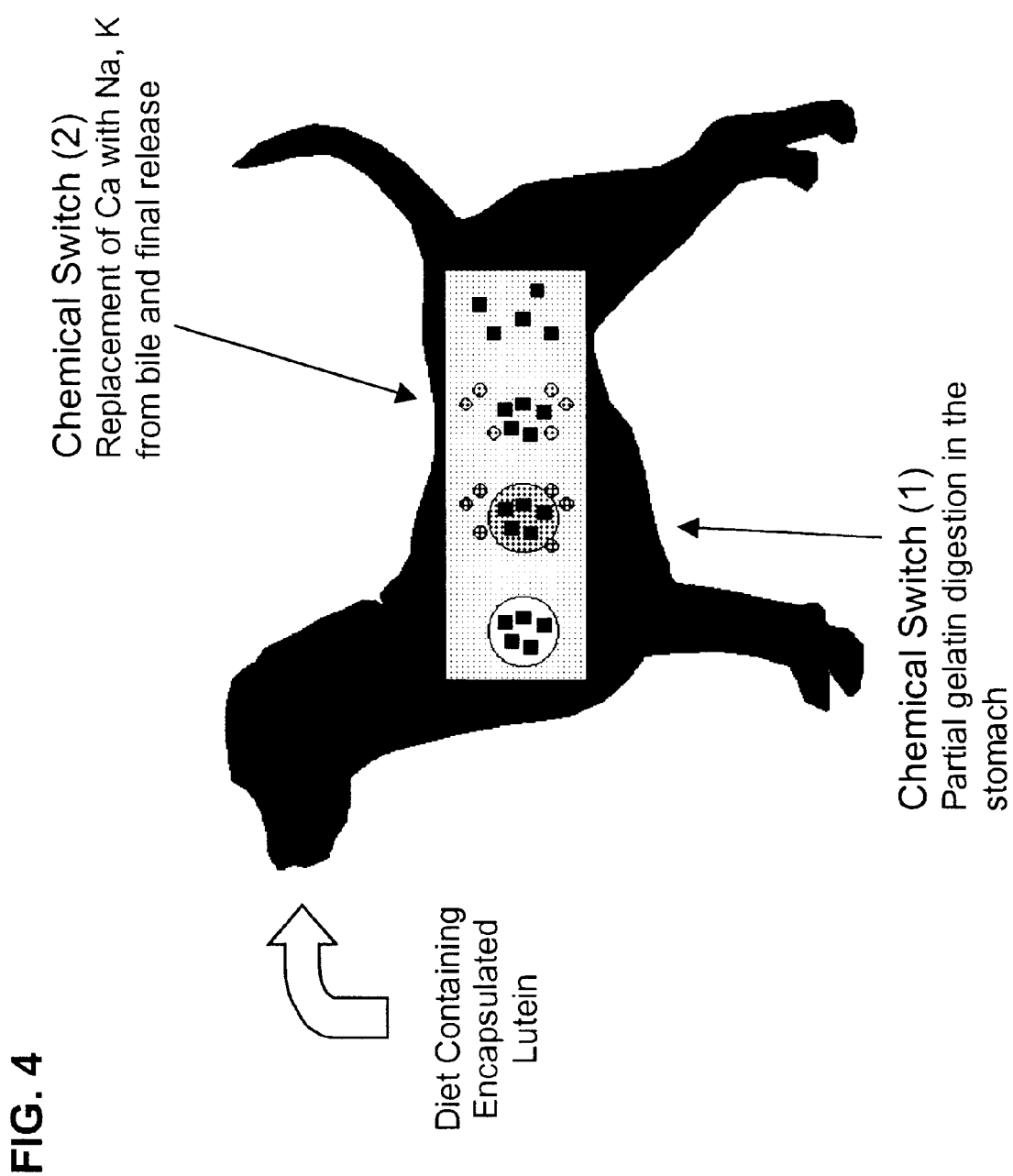
FIG. 4 is a diagrammatical view of the breakdown of the protective coating and release of the protected bioactive compound upon ingestion of a feedstuff containing the protected compound by a dog.

Upon ingestion of a food product containing beadlets of the present invention, the beadlets are broken down by two primary processes (FIG. 4). Sodium ions present in the digestive tract of an organism that has ingested the food product readily convert the insoluble calcium alginate into sodium alginate which is highly soluble in water. The gelatin, not being cross-linked, is readily broken down in the digestive tract by hydrolysis. Thus the present invention provides a method for protecting the activity of a biologically important compound through processing and storage of a food product containing the compound and wherein the protective coating is removed by one or more switches, compounds or environmental conditions in an organism that is fed the food product.

It is important to note that the active compound, provided it is not overly reactive with calcium ions, is not chemically altered by the encapsulation process. In particular, the crystalline lutein used in the specific embodiments is not changed by the process. Throughout the encapsulation process and extrusion of a food product to which the beadlets of encapsulated lutein have been added, the lutein is still present as the discrete lutein crystals that are present in the starting material.

The amount of sodium alginate can be adjusted through a range to achieve the results desired in specific applications. The concentration of ancillary polymeric compounds may not be critical for a given application. While gelatin is the preferred ancillary polymeric material, other polymeric materials that could be used either alone or in combination with gelatin or each other include albumin, casein or other proteins, carrageenan, guar gum, xanthan gum, or other polysaccharides.

Although the invention has been described with respect to a preferred embodiment thereof, it is to be also understood that it is not to be so limited since changes and modifications can be made therein which are within the full intended scope of this invention as defined by the appended claims.

We claim:

1. A method of protecting heat- and/or oxygen-labile compounds, comprising the steps of:
   a. preparing an aqueous solution of an alkali metal salt of alginate;
   b. adding to said solution a polymeric compound selected from the group consisting of gelatin, albumin, casein, carrageenan, guar gum, and xanthan gum;
   c. adding to said solution a heat- and/or oxygen liable compound;
   d. directing droplets of said solution into a source of calcium ions in aqueous solution to form water insoluble beadlets of said heat- and/or oxygen-liable compound dispersed within a matrix of calcium alginate and said polymeric compound.

2. The method of claim 1, wherein the heat- and/or oxygen-labile compound is selected from the group consisting of carotenoids, vitamins, and enzymes.

3. The method of claim 1, further comprising the step of adding a stabilizing agent to the heat- and/or oxygen-labile compound prior to the step of adding the labile compound to the solution.

4. The method of claim 3, wherein the stabilizing agent is an antioxidant.

5. The method of claim 1, wherein the alkali metal is sodium.

6. A method of protecting, heat- and/or oxygen-labile compounds from degradation by oxidizing agents and/or free-radical initiators, comprising the steps of:
   a. preparing an aqueous solution of an alkali metal salt of alginate;
   b. adding to said solution a polymeric compound selected from the group consisting of gelatin, albumin, casein, carrageenan, guar gum, and xanthan gum;
   c. adding to said solution an oxidizing agent and/or free-radical initiator;
   d. directing droplets of said solution into a source of calcium ions in aqueous solution to form water insoluble beadlets of said oxidizing agent and/or free-radical initiator dispersed within a matrix of calcium alginate and said polymeric compound.

7. The method of claim 6, wherein the oxidizing agent and/or free-radical initiator is a compound which releases polyvalent metal ions in solution.

8. The method of claim 6, further comprising the step of adding a stabilizing agent to the oxidizing agent and/or free-radical initiator prior to the step of adding the compound to the solution.

9. The method of claim 6, wherein the alkali metal is sodium.

10. A feedstuff for an organism, comprising:
    a. a feedstuff substrate which will be processed and stored prior to ingestion by the organism;
    b. a feedstuff supplement compound; and
    c. a protective coating applied to the supplement compound by the method according to claim 1 or claim 6, prior to addition of the supplement compound to the feedstuff substrate to protect the supplement compound from degradation during processing and storage of feedstuff and which is degraded upon ingestion of the feedstuff by the organism to release the feedstuff supplement.

11. The feedstuff as defined in claim 10, wherein said protective coating is a mixture of calcium alginate and an ancillary polymeric material selected from a group consisting of gelatin, albumin, casein carrageenan, guar gum, and xanthan gum.

* * * * *